(12) United States Patent
Park

(10) Patent No.: US 8,191,512 B2
(45) Date of Patent: Jun. 5, 2012

(54) STRUCTURE OF HEAT EXCHANGE APPARATUS FOR GAS BOILER

(75) Inventor: No Jin Park, Chungcheongbuk-do (KR)

(73) Assignee: Daesung Industrial Corporation, Seoul (KR)

( * ) Notice: Subject to any disclaimer, the term of this patent is extended or adjusted under 35 U.S.C. 154(b) by 762 days.

(21) Appl. No.: 12/275,931

(22) Filed: Nov. 21, 2008

(65) Prior Publication Data

US 2009/0288813 A1 Nov. 26, 2009

(30) Foreign Application Priority Data

May 26, 2008 (KR) .................. 20-2008-0006806 U

(51) Int. Cl.
*F22B 1/02* (2006.01)

(52) U.S. Cl. ............... 122/18.1; 122/33; 165/169

(58) Field of Classification Search ............ 122/18.1, 122/32, 33, 34; 165/169
See application file for complete search history.

(56) References Cited

U.S. PATENT DOCUMENTS

| | | | | |
|---|---|---|---|---|
| 4,053,293 A | * | 10/1977 | Combs | 55/315.1 |
| 4,482,004 A | * | 11/1984 | Grover | 165/47 |
| 4,651,680 A | * | 3/1987 | Couprie | 122/20 B |
| 6,662,758 B1 | * | 12/2003 | Shin | 122/18.1 |
| 7,302,916 B2 | * | 12/2007 | LeMer et al. | 122/18.1 |
| 8,074,610 B2 | * | 12/2011 | Kim et al. | 122/15.1 |
| 2006/0196450 A1 | * | 9/2006 | Le Mer et al. | 122/18.1 |
| 2006/0266306 A1 | * | 11/2006 | Le Mer et al. | 122/250 R |
| 2011/0114300 A1 | * | 5/2011 | Kim et al. | 165/181 |

FOREIGN PATENT DOCUMENTS

EP 1522801 A1 * 4/2005
GB 2043850 A * 10/1980

* cited by examiner

*Primary Examiner* — Gregory A Wilson
(74) *Attorney, Agent, or Firm* — Hoffman & Baron, LLP

(57) ABSTRACT

A heat exchange apparatus of a high-load bottom-up-type condensing gas boiler is disclosed. In the gas boiler system having a ventilator attached to a lower part of a combustion chamber, the heat exchange apparatus structured in such a manner that a Venturi path for achieving a high-pressure and high-velocity flow of exhaust gas is mounted in an exhaust duct formed between a sensible heat exchanger in which first heat exchange is performed and a latent heat exchanger to which firstly heat-exchanged exhaust gas is flown, so that the sensible heat exchanger and the latent heat exchanger are perfectly independent from the exhaust gas after combustion. In addition, a curve-type exhaust guide and a V-guide are mounted to an upper part of the latent heat exchanger to guide a flow of the exhaust gas being firstly heat-exchanged and discharged from the sensible heat exchanger, such that condensed water generated during second heat exchange in the latent heat exchanger can be smoothly discharged and the thermal efficiency is enhanced.

3 Claims, 2 Drawing Sheets

PRIOR ART

STRUCTURE OF HEAT EXCHANGE APPARATUS FOR GAS BOILER

CROSS-REFERENCE TO RELATED APPLICATION

This application claims priority based on Korean Patent Application No. 20-2008-0006806 filed on May 26, 2008, which is incorporated herein by reference.

BACKGROUND OF THE INVENTION

1. Field of the Invention

The present invention relates to a gas boiler employing a bottom-up-type Bunsen burner combustion system. More particularly, the present invention relates to a heat exchange apparatus equipped with an exhaust gas guiding device for efficiently discharging exhaust gas and condensed water, in a waste heat collecting device for the gas boiler which collects waste heat generally produced after heat exchange with heating water through a sensible heat exchanger and then discharged as exhaust gas, through a latent heat exchanger, such that the thermal efficiency is improved, resulting in a reduction of gas consumption.

2. Description of the Related Art

In general, a gas boiler is structured to heat rooms or water as heat exchange is performed in such a manner that heat of exhaust gas produced by burning fuels, such as gas, is exchanged with heat of water, such as heating water, in a heat exchanger disposed at an upper part of a combustion chamber.

A combustion gas generated after the gas is burned in the gas boiler is supplied to perform heat exchange by passing through the heat exchanger and then discharged to the outside of the gas boiler as exhaust gas. Thus-discharged exhaust gas has a temperature lower than the initial temperature of the combustion gas.

Produced by burning of the gas in the gas boiler, the combustion gas is supplied to perform heat exchange through the heat exchanger, and is then discharged out of the gas boiler as exhaust gas. In this case, the exhaust gas has a temperature lower than the initial temperature of the combustion gas but higher than the room temperature. Therefore, there have been researches into a method for recycling a latent heat of the exhaust gas.

FIG. 1 shows a conventional gas boiler 10. Referring to the drawing, a waste heat collecting device 80 is mounted to an upper part of a combustion chamber 13 of the gas boiler 10.

The gas boiler 10 comprises a ventilator 11, a burner 12, the combustion chamber 13, a sensible heat exchanger 20, a duct 30, and a chamber 50 receiving a latent heat exchanger 60.

More specifically, the ventilator 11 is mounted at a lowermost end of the gas boiler 10, comprising a motor and a ventilation fan. The motor is rotated by external power application to drive external air into the gas boiler 10. The ventilation fan, rotated by a rotational force of the motor, draws in the external air through an opening fluidly communicated with the outside and then exerts a ventilation force for sending the external air through an opening fluidly communicated with the inside of the gas boiler.

The sensible heat exchanger 20 is disposed at an upper inside of the combustion chamber 13. Since the sensible heat exchanger 20 comprises a plurality of tubes 61 for circulation of heating water, the heating water is circulated by passing through tubes 62 of the latent heat exchanger 60 and then being supplied to the tubes 61 of the sensible heat exchanger 20.

The waste heat collecting device 80 comprises the duct 30 mounted to an upper part of the sensible heat exchanger 20, and also comprises the chamber 50, an exhaust guide 51, an exhaust hood 70, the latent heat exchanger 60, a drain 53, and a heat screen 40.

The duct 30 is mounted at an upper part of the sensible heat exchanger 20 of the combustion chamber 13. A Venturi member 31 is formed inside the duct 30 to increase flow velocity of the exhaust gas passing therethrough, such that the exhaust gas supplied from the combustion chamber 13 moves faster than at first when reaching an outlet of the duct 30. Additionally, an inside of the duct 30 is in the form of a double-wall and stuffed with an insulating material so as to restrain undesirable loss of heat at the duct 30 as much as possible.

The chamber 50 has a box form with an opened top side and closely contacts an upper end of the duct 30. The heat screen 40, being interposed between a lower end of the chamber 50 and the upper end of the duct 30, seals a connection part between the duct 30 and the chamber 50 while interrupting unnecessary thermal conduction.

A double heat exchange has been suggested as a method for recycling the latent heat of the exhaust gas. According to this, the exhaust gas is heat-exchanged in the sensible heat exchanger which performs heat exchange by heat of an initial combustion gas, and then heat-exchanged again in the latent heat exchanger disposed at the upper part of the sensible heat exchanger. Thus, the heat exchange between the combustion gas and the exhaust gas is performed first in the sensible heat exchanger and second in the latent heat exchanger. However, since the exhaust gas is directly discharged to the outside through the exhaust hood, the thermal efficiency is not satisfactory.

Also, according to the double heat exchanging method, during heat exchange in the sensible heat exchanger, condensed water generated in the respective tubes serving as paths for the heating water falls to the sensible heat exchanger, thereby deteriorating the thermal efficiency of the sensible heat exchanger. Furthermore, moisture and a nitric oxide contained in the condensed water may infiltrate the sensible heat exchanger and other electronic equipments, thereby damaging the equipments, for example, by causing corrosion.

In addition, since the latent heat exchanger is mounted directly above the sensible heat exchanger, there occurs a temperature difference between the sensible heat exchanger wherein relatively high-temperature heat exchange is performed and the latent heat exchanger wherein relatively low-temperature heat exchange is performed. Such a temperature difference between the sensible heat exchanger and the latent heat exchanger causes heat transfer or thermal flux. As a result, the thermal efficiency of the both heat exchangers is deteriorated.

As the above problems are caused by the relative positions between the sensible heat exchanger and the latent heat exchanger, there has been recently developed a double heat exchanger constructed by mounting a latent heat exchanger at the outside of a sensible heat exchanger. More specifically, the double heat exchanger is structured in such a manner that a burner is mounted to an upper part of a boiler in accordance with a double structure of the heat exchangers. According to this structure, heat generated from the burner is moved down through the center of the sensible heat exchanger and exchanged with heat of the sensible heat exchanger. Additionally, as exhaust gas heat-exchanged in the sensible heat exchanger is moved upward through the latent heat exchanger mounted at the outside of the sensible heat exchanger, heat exchange is performed again. However, because the sensible heat exchanger and the latent heat exchanger are exposed directly to the heat of the burner, all component parts of the heat exchangers are required to have high thermal resistance, thereby increasing the manufacturing cost and complicating the assembling process.

SUMMARY OF THE INVENTION

Therefore, the present invention has been made in view of the above problems, and it is an object of the present invention to provide a heat exchange apparatus for a gas boiler with an exhaust waste heat collecting device, capable of enhancing flow velocity in a path by connecting a sensible heat exchanger and a latent heat exchanger through a duct without any mechanical ventilator or backflow prevention device between the heat exchangers and forming a Venturi path in the duct, whereas mounting the sensible heat exchanger and the latent heat exchanger separately from each other, such that heat transfer between the two heat exchangers and a thermal flux can be prevented.

It is another object of the present invention to provide a heat exchange apparatus equipped with an exhaust gas guiding device such that exhaust gas is guided by the exhaust gas guiding device such as a curve-type exhaust guide or a V-guide in the latent heat exchanger, before being discharged through an exhaust hood, so as to maximize the thermal efficiency and facilitate discharge of condensed water.

In accordance with the present invention, the above and other objects can be accomplished by the provision of a heat exchange apparatus in which a sensible heat exchanger is disposed at an upper part of a combustion chamber, in order to collect heat of the exhaust gas while the exhaust gas, which is heat-exchanged in the sensible heat exchanger first, is heat-exchanged again in a latent heat exchanger connected to a rear end of the sensible heat exchanger through a duct and then discharged through a chamber which receives the latent heat exchanger.

The sensible heat exchanger of the combustion chamber and the latent heat exchanger may be fluidly connected to each other only through a duct without a dedicated exhaustion device or a backflow prevention device mounted between the heat exchangers. In addition, a Venturi member is formed in the duct such that loss of heat in the duct is minimized by enhancing the flow velocity in the duct.

Also, the present invention is characterized in that an inner wall of the duct has a double wall structure and an insulating material fills an inside of the double wall. Therefore, until the exhaust gas firstly heat-exchanged through the sensible heat exchanger reaches the latent heat exchanger, loss of heat can be restrained.

Furthermore, the present invention is characterized in that a curve-type exhaust guide is provided to form an exhaust path in a chamber receiving the latent heat exchanger which comprises a plurality of tubes, and a V-guide having a V-shape is further connected successively from the curve-type exhaust guide. Accordingly, the flow of exhaust gas is converted downward thereby facilitating discharge of condensed water. Especially, the condensed water can be collected to an end of the downward flow and discharged out through a dedicated outlet. In addition, the thermal efficiency can be maximized.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Hereinafter, an exemplary embodiment of the present invention will be described in detail with reference to the accompanying drawings.

Figure 1:
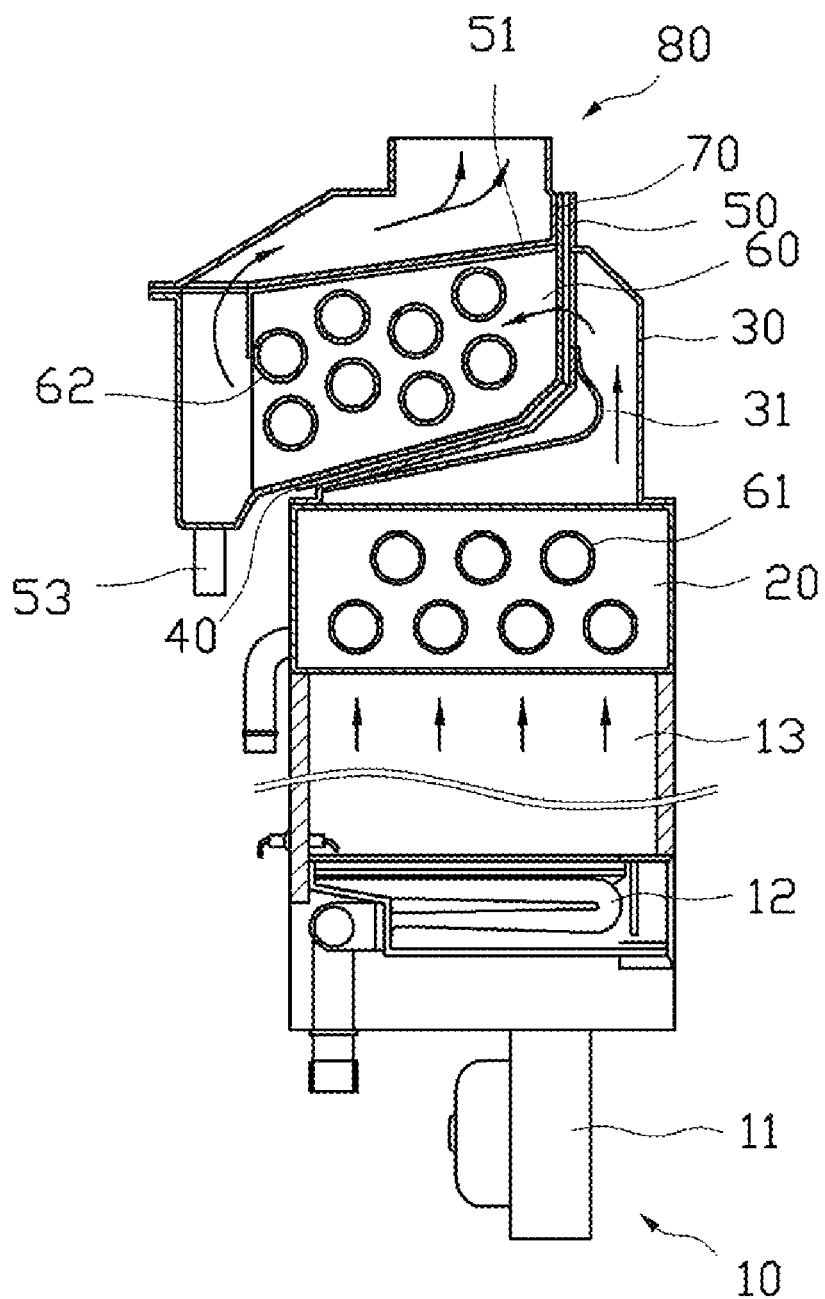
FIG. 1 is a sectional view of a waste heat collecting device according to a conventional art.
Figure 2:
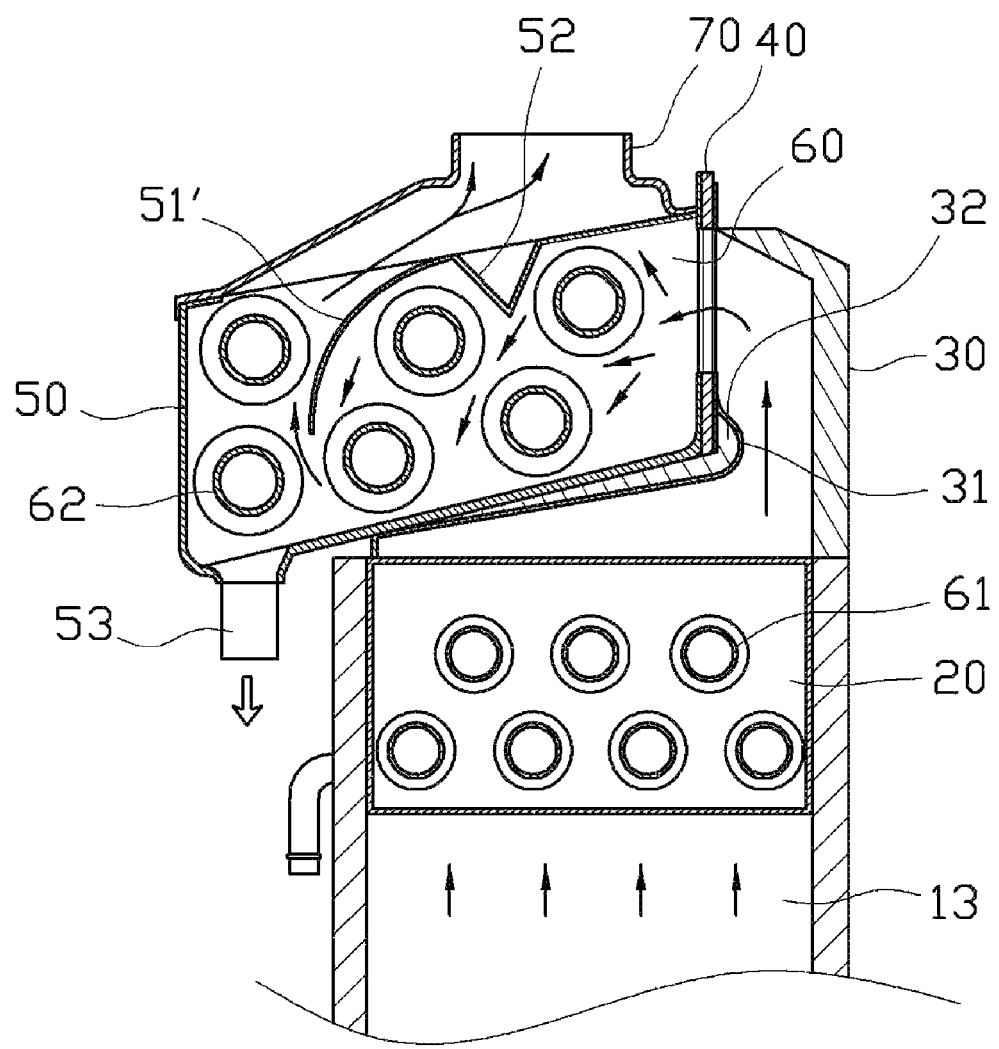
FIG. 2 is a sectional view of a gas boiler according to an embodiment of the present invention.

FIG. 2 shows an exhaust gas guiding device of a gas boiler 10 according to the embodiment of the present invention. Like elements shown in FIG. 1 will be referred to with like reference numerals.

A V-guide 52 attached to a curve-type exhaust guide 51' is configured to convert a flow of the exhaust gas being guided into a chamber 50 through a duct 30, thereby enhancing the thermal efficiency and promoting discharge of condensed water. The direction of the exhaust gas is converted again from a downward flow to an upward flow at an end of the curve-type exhaust guide 51'. Although only one V-guide 52 is shown in FIG. 2, the number of the V-guide 52 is not specifically limited. That is, a plurality of the V-guides 52 may be provided if necessary. The curve-type exhaust guide 51' has a downward curve. However, the curve-type exhaust guide 51' may be in shapes other than as shown in the drawing. The curve-type exhaust guide 51' and the V-guide 52 are mounted to an upper part of a latent heat exchanger 60.

When the exhaust gas flows downward at the end of the curve-type exhaust guide 51', condensed water generated from the latent heat exchanger 60 falls down whereas the exhaust gas is discharged to the outside through an exhaust hood 70. Here, the condensed water is discharged out through a drain 53.

The exhaust gas moves through a communication unit between the chamber 50 and the duct 30, and a communication unit between the curve-type exhaust guide 51' and the exhaust hood 70.

The exhaust hood 70 is formed to closely contact an upper end of the curve-type exhaust guide 51'. More specifically, the exhaust hood 70 is in the form of a tube which is opened at one side of a lower end thereof to be fluidly communicated with an opening formed at one end of the curve-type exhaust guide 51', and also opened at the other side of an upper end thereof to be fluidly communicated with the outside of the gas boiler 10.

The latent heat exchanger 60 has a similar form to the sensible heat exchanger 20. More specifically, the latent heat exchanger 60 roughly has a box form by comprising one or more tubes 61 being bent or curved. Also, the latent heat exchanger 60 is formed corresponding to an inner shape of the chamber 50 to be received and fixed in the chamber 50.

The drain 53 is opened at one side of a bottom of the chamber 50 for the condensed water collected in the chamber 50 to drain to the outside therethrough. The drain 53 is in the form of a projected pipe having a predetermined width.

According to the embodiment of the present invention, the duct 30 is connected to one side of the chamber 50 in fluid communication with the chamber 50 and the exhaust hood 70 is fluidly communicated with the curve-type exhaust guide 51' at the other side. On a side of the bottom of the chamber 50 opposite to the exhaust hood 70, the drain 53 is mounted to be fluidly communicated with the outside.

The bottom of the chamber 50 is lowered toward the drain 53 so that the condensed water is more easily discharged through the drain 53.

In addition, an insulating material 32 is put in the duct 30 that connects the sensible heat exchanger 20 and the latent heat exchanger 60 such that a low temperature of the condensed water and the exhaust gas in the latent heat exchanger 60 is not conducted to the sensible exhaust.

As apparent from the above description, in a waste heat collecting device in which a sensible heat exchanger is disposed at an upper part of a combustion chamber so as to collect heat of the exhaust gas as the exhaust gas heat-exchanged in the sensible heat exchanger first is heat-exchanged again in a latent heat exchanger connected to a rear end of the sensible heat exchanger through a duct and then discharged through a chamber that receives the latent heat exchanger, a Venturi member is formed in the duct without any dedicated exhaust device or backflow prevention device mounted between the sensible heat exchanger and the latent heat exchanger. Therefore, flow velocity in the duct is enhanced so that loss of heat in the duct can be minimized. Also, since moisture or water drops from the latent heat exchanger can be prevented from affecting the performance of the sensible heat exchanger, the thermal efficiency of the heat exchange apparatus can be improved.

The present invention is also effective in that condensed water generated from the latent heat exchanger is prevented from contacting and damaging other component parts of the gas boiler because the latent heat exchanger is separated from the other parts by existence of the chamber.

Furthermore, according to the embodiment of the present invention, the exhaust gas being sent by a ventilator is accelerated while moving in the Venturi member in the duct. Therefore, deterioration of flow velocity of the exhaust gas, which is caused during circulation of the exhaust gas through the sensible heat exchanger and the latent heat exchanger, can be prevented.

Also, a curve-type exhaust guide is formed in a chamber receiving the latent heat exchanger to form an exhaustion path, and a V-guide is successively formed in connection with the curve-type exhaust guide such that the flow of the exhaust gas is converted downward. Accordingly, the thermal efficiency is improved while facilitating discharge of the condensed water.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A heat exchange apparatus in a high-load bottom-up-type combustion condensing boiler comprising a ventilator attached to a front of a combustion chamber, the heat exchange apparatus structured in such a manner that a Venturi path for achieving a high-pressure and high-velocity flow of exhaust gas is mounted in an exhaust duct formed between a sensible heat exchanger in which first heat exchange is performed and a latent heat exchanger to which firstly heat-exchanged exhaust gas is flown, so that the sensible heat exchanger and the latent heat exchanger are perfectly independent from the exhaust gas after combustion, wherein a curve-type exhaust guide and a V-guide are mounted to an upper part of the latent heat exchanger to guide a flow of the exhaust gas being firstly heat-exchanged and discharged from the sensible heat exchanger, such that condensed water generated during second heat exchange in the latent heat exchanger can be smoothly discharged and the thermal efficiency is enhanced.

2. The heat exchange apparatus according to claim 1, wherein the exhaust duct interconnecting the sensible heat exchanger and the latent heat exchanger is charged with an insulating material so as to prevent conduction of low temperature of the condensed water and the exhaust gas in the latent heat exchanger to the sensible heat exchanger.

3. The heat exchange apparatus according to claim 1, wherein the V-guide is plurally provided and the curve-type exhaust guide is curved downward.

* * * * *